3,303,198
SUBSTITUTED BENZYL ESTERS OF NIPECOTIC ACID AND ISONIPECOTIC ACID AND METHODS OF PREPARING THE SAME
Hans Suter, Schaffhausen, Switzerland, Ernst Felder, Milan, Italy, and Hans Zutter, Schaffhausen, Switzerland, assignors to Eprova Limited, Schaffhausen, Switzerland, a corporation of Switzerland
No Drawing. Filed Apr. 15, 1964, Ser. No. 360,060
Claims priority, application Switzerland, May 3, 1963, 5,590/63
19 Claims. (Cl. 260—294.3)

This invention relates to novel substituted benzyl esters of piperidine carboxylic acids, and more particularly to substituted benzyl esters of nipecotic acid and of isonipecotic acid, and to methods of preparting the esters.

We have found that substituted benzyl esters of nipecotic acid and isonipecotic acid having the formula

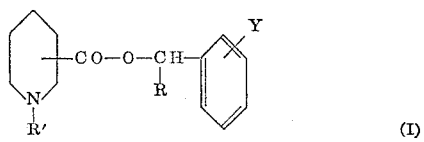

have spasmolytic effects when R is an alkyl radical having 2 to 8 carbon atoms or an aralkyl radical having 7 to 10 carbon atoms; R' is hydrogen or lower alkyl; and Y is hydrogen, halogen, or lower alkyl. The compounds are preferably employed in the form of their acid addition salts, or as quaternary piperidinium salts.

The substituted benzyl piperidine carboxylates of the invention are most conveniently prepared from pyridine carboxylic acids in two sequences of reactions represented by the following diagram:

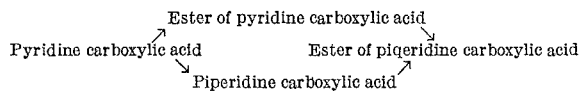

In either method, a pyridine ring is hydrogenated, and an acid is converted to its ester. The two methods differ in the sequence of these steps.

In the first method, an ester of a pyridine carboxylic acid with a substituted benzyl alcohol of the formula

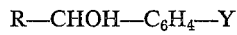

an acid addition salt of the ester, or a quaternary alkyl pyridinium salt of the ester is hydrogenated to the corresponding piperidine derivative. Hydrogen in the presence of a catalyst is the preferred hydrogenation agent.

In the second method, a reactive derivative of a piperidine carboxylic acid or of its N-alkyl homolog is esterified with an alcohol of the formula

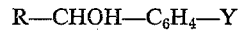

or, alternatively, a salt of the piperidine carboxylic acid or of its N-alkyl homolog is esterified with a reactive derivative of the alcohol.

If the product obtained by either method has a reactive hydrogen atom on the introgen atom of the piperidine ring, it may be alkylated by reaction with a lower alkanal and a reducing agent, or by reaction with a reactive derivative of a lower alkanol, such as a halide ester.

The substituted benzyl piperidine carboxylate obtained may be converted in a known manner to a quaternary piperidinium compound by reaction with methyl chloride, methyl bromide, methyl iodide, dimethylsulfate, methyl methanesulfonate, ethyl iodide, propyl bromide, and the like.

The first method mentioned above is generally preferred. The pyridine carboxylates which are obtained as intermediate products are capable of being purified in a particularly convenient manner. This permits the use of a crude substituted benzyl alcohol in the initial esterification step. The first method, however, is not universally applicable. Where the benzyl radical is substituted by halogen in position Y of Formula I, hydrogenation of the pyridine ring after esterification replaces halogen by hydrogen. The substituted benzyl esters which have short, straight-chained alkyl substituents R in the alpha position are sensitive to strong reducing agents. Such agents tend to split the ester and to hydrogenate the benzyl alcohol component to a hydrocarbon of the type $$R—CH_2—C_6H_5$$

and the yield of the desired product is impaired.

The second method is generally applicable. The reactive piperidine carbonic acid derivatives which are successfully employed in the esterification step include the carboxyl halides and the anhydrides.

The ester bases of Formula I are generally high boiling liquids capable of being distilled in a vacuum without decomposition. They are insoluble or only slightly soluble in water. For oral application in solid form, and for parenteral application in aqueous media, the ester bases are preferably converted to the water soluble acid addition salts, or to quaternary piperidinium salts.

The spasmolytic effect of the compounds of the invention in vitro is at least equal to that of the best spasmolytics now in clinical use. It is very much higher than that of the chemically similar benzylamides of nicotinic acid which are known, clinically tested spasmolytics, more specifically to α-phenylbenzyl nicotinylamide (U.S. Patent No. 2,483,250) and α-phenylheptyl nicotinylamide (Therapeutische Umschau 20, No. 5, 213–215, 1963). The substituted benzyl nipecotylamides (compounds F and G in Table I), the compounds of most closest structure to the inventive piperidine carboxylic acid esters also are relatively weak spasmolytics.

The results of in vitro tests performed on isolated guinea pig intestines with representative compounds of the invention and with other spasmolytic agents are listed in Table I together with data on toxicity to mice.

In this table, the several compounds tested are identified by code letters as follows:

A—(1-phenyl-2-methyl)-1-butyl N-methyl-nipecotate (see Example 5)
B—(1-phenyl-2-methyl)-1-butyl N-methyl-isonipecotate (see Examples 1 and 2)
C—(1-phenyl-2-methyl)-1-butyl N-methyl-isonipecotate N-methobromide (see Example 3)
D—1-phenyl-1-n-heptyl nipecotate (see Example 7)
E—1,2-diphenylethyl N-methyl-nipecotate N-methobromide (see Example 14)
F—1-nipecotylamido-1-phenyl-n-heptane
G—1-nipecotylamido-1,2-diphenylethane
H—1-nicotinylamido-1,2-diphenylethane (see U.S. Patent No. 2,483,250)
I—1-nicotinylamido-1-phenyl-n-heptane (see Therapeutische Umschau, l.c.)
J—papaverine The spasmolytic activity of the several compounds on the isolated guinea pig intestine is tabulated relative to papaverine as a standard. Aqueous solutions were employed for injection in the toxicity tests except where an asterisk indicates the use of an oil suspension, and "IS" indicates omission of a test because of insolubility in water.

TABLE I

| Compound | Toxicity, $DL_{50}$, mg./kg. | | | Relative activity against spasms by— | | | |
|---|---|---|---|---|---|---|---|
| | Per os | intraperit. | Intravenous | acetyl-choline | Histamine | $BaCl_2$ | Average |
| A | 310 | 150 | 52 | 12.5 | 3.3 | 0.41 | 5.4 |
| B | 420 | 158 | 40 | 12.5 | 6.6 | 0.25 | 6.45 |
| C | | | 64 | 4.2 | 20 | 0.64 | 0.06 | 6.9 |
| D | 1,400 | 32 | 14.6 | 4 | 10 | 13 | 9 |
| E | 340 | 121 | | 100 | 2.2 | 12 | 38 |
| F | | | | 5 | 0.4 | | |
| G | | | | 0.25 | 0.36 | 0.2 | 0.27 |
| H | 2,000 | IS | IS | 0.2 | 0.3 | 0.55 | 0.5 |
| I | 750 | *620 | IS | 1–1.5 | 0.7–1 | 2 | 1.4 |
| J | 745 | 63 | 33.1 | 1 | 1 | 1 | 1 |

While test test results shown in Table I show superior spasmolytic activity for the compounds of the invention, tests for toxicity and spasmolytic activity performed in vitro are not fully indicative of the physiological properties of spasmolytic agents. The compounds of the invention therefor were tested on live animals. These tests fully confirmed the results listed in Table I. (1-phenyl-2-methyl)-1-butyl N-methyl-isonipecotate, for example, prevents intestinal motility in the cat and reduces the tonus at a dosage as low as 0.5 mg./kg.

In human patients, the compounds of the invention are effective in combating neurogenous spasms when applied to adults in doses as low as 5 milligrams. The compounds may be given orally, or injected into muscles or veins. The dosage generally varies with the indication and with the mode of application between 2.5 and 100 milligrams of the active agent. The lowest portion of this dosage range is applicable to intravenous injection, the highest portion to oral application.

The compounds are particularly useful in counteracting spasms of the female genito-urinary tract. When employed in therapeutically effective amounts, they do not unfavorably affect the labor of child birth, and they are highly effective in shortening the induction period. Although they have no significant analgesic effects per se, they reduce pain in pregnant women suffering from pyelonephritis. Spasms of the uterus and of the vagina after birth are also relieved by the substituted benzyl esters of the invention.

The acid fumarate of (1-phenyl-2-methyl)-1-butyl N-methyl-isonipecotate is typical of the esters of the invention. A single intramuscular injection of one milliliter of a ½% aqueous solution has been given successfully during strong labor at the time when the cervix was dilated to 2 to 3 centimeters. The average induction period of a group of primiparae was shortened by the injection by at least 50% as compared to a control group, and similar effects were observed in multiparous women.

No adverse effect on the uterus was observed during the induction period or during the expulsion period, nor were there other significant side effects on mother or child.

Intravenous injection of a 10 mg. dose has approximately the same effect as the intramuscular injection of twice this amount. The spasmolytic effect also sets in more rapidly. Oral application requires approximately twice the intramuscular dosage, but parenteral application is preferred during labor.

Four tablets per day, each containing 20 mg., of the active agent, have been found effective in alleviating pain in pyleo-nephritis gravidarium within about two days. Two to three tablets per day reduce pain in spasms after birth.

The spasmolytic activity of the compounds is unrelated to the acid which is employed to form a soluble salt with the substituted benzyl piperidine carboxylates of Formula I or with the piperidinium bases derived therefrom. The soluble acid addition salts formed with any physiologically tolerated acid may thus be employed, such as the hydrochlorides, hydrobromides, sulfates, lactates, and fumarates. The hydrochlorides, hydrobromides, and fumarates of the ester bases of the invention are readily prepared in solid form, but some of the halide salts are hygroscopic and deliquescent so that they cannot conveniently be stored in the solid state.

The acid fumarates are readily obtained in crystalline form. They are stable in contact with moist air, and are not deliquiescent. Their solubility in water is limited, and the aqueous solutions have low pH values. Injectable aqueous solutions of the fumarates are readily prepared by means of equivalent amounts of physiologically tolerated bases such as sodium hydroxide, N-methyl-glucamine, diethanolamine, and the like.

The quaternary piperidinum salts of the substituted benzyl piperidine carboxylates of the invention with lower alkyl esters of strong, physiologically tolerated acids are generally water soluble and are therefore useful therapeutic agents. Lower alkyl esetrs of hydrochloric, hydrobromic, hydroiodic, sulfuric, and alkylsulfonic acids are typical of the quaternating agents that may be reacted with the ester bases to form soluble compounds.

The following examples are further illustrative of this invention, but it will be understood that the invention is not limited to the examples.

EXAMPLE 1.—(1-PHENYL-2-METHYL)-1-BUTYL N-METHYL ISONIPECOTATE (a) *(1-phenyl-2-methyl)-1-butyl isonicotinate*

71 grams (0.4 mole) of freshly prepared isonicotinyl chloride hydrochloride (0.4 mole) were suspended in 400 milliliters benzene, and 65.7 grams (0.4 mole) of a crude 1-phenyl-2-methyl-1-butanol were added. A mixture of 95 grams (1.2 moles) pyridine and 80 milliliters benzene was admixed drop by drop with stirring over a period of one hour. A weakly exothermic reaction occurred. When it had subsided, the reaction mixture was heated to boiling and stirred at the same temperature for about six hours. Upon cooling, pyridine hydrochloride was precipitated and was removed by filtration (91.4 grams).

The filtrate was evaporated in a vacuum at 100° C. to remove benzene and the excess of pyridine. The residue was taken up in about 600 milliliters petroleum ether (boiling range 40° to 60° C.), and the solution obtained was left standing overnight, whereby a flocculent precipitate of isonicotinic acid was formed. It was filtered off.

The solvent was distilled off from the filtrate. The crude isonicotinic acid ester obtained as a residue weighed 104 grams. A sample was purified by distillation in a vacuum (B.P. 140° at 0.2 mm. Hg). The bulk of the crude ester was converted to the hydrochloride by dissolving it in about 200 ml. ethyl ether, and adding 90 ml. of a 6-normal solution of hydrogen chloride in ether. When recrystallized from a mixture of four parts di-isopropy ether and one part isopropanol, the hydrochloride melts at 114°–118° C. It is only sparingly soluble in water, but readily soluble in lower alkanols, chloroform, and glacial acetic acid.

(b) (1-phenyl-2-methyl)-1-butyl N-methyl-isonipecotate 60 grams of the (1-phenyl-2-methyl)-1-butyl isonicotinate hydrochloride (0.223 mole) were dissolved in 300 ml. glacial acetic acid, and the solution was mixed with 10 grams of a 5% platinum catalyst on activated carbon, and with 10 grams of a similar 5% palladium catalyst. It was then hydrogenated at a temperature between about 40° and 50° C. at approximately 3 atmospheres hydrogen pressure.

The amount of hydrogen calculated for saturation of the pyridine ring was absorbed within two hours. The hydrogenation was interrupted at this stage, and 25 ml. of a 40% aqueous formaldehyde solution were added to the hydrogenation mixture. Hydrogenation was then continued at room temperature, whereby a methyl radical was attached to the nitrogen atom in the piperidine ring.

The contents of the hydrogenation flask were filtered to remove the catalysts, and the filtrate was evaporated to dryness in a vacuum. The residue was admixed with stirring to a solution of 150 g. potassium carbonate in 250 ml. water containing 300 g. crushed ice, while the solution was covered with a layer of 250 ml. ether. The (1-phenyl-2-methyl) - 1 - butyl N-methyl-isonipecotate formed was received in the ether layer. The layer was dried with desiccated sodium sulfate, and evaporated to dryness.

The residue weighed 47 grams (73% of theoretical yield) and contained 97% of the pure ester. The equivalent weight found was 198.6 (calculated 189.4). The crude product was purified by vacuum distillation. It has a boiling point of 118°–118.5° C. at 0.05 mm. Hg. The ester base is almost insoluble in water, but readily soluble in organic solvents and in aqueous acid solutions.

(c) Acid fumarate of (1-phenyl-2-methyl)-1-butyl N-methylisonipecotate 37.7 grams of the ester base of 97% purity (0.126 mole) were dissolved in 60 ml. methanol. 14.7 grams fumaric acid (0.126 mole) were added, and the mixture was heated until an almost clear solution was obtained. It was filtered, and 350 ml. diethyl ether were added to the filtrate, whereby the acid fumarate of the ester base was precipitated in crystalline form. It was filtered off with suction, washed, and dried.

The acid fumarate melts at 146° to 148° C. It can be recrystallized from a mixture of ethyl acetate with a little isopropanol. It is moderately soluble in cold water (3%), readily soluble in methanol, ethanol, and chloroform, and soluble in isopropanol, glacial acetic acid, warm acetone and ethyl acetate, only sparingly soluble in diethyl ether and liquid petroleum hydrocarbons.

(d) Preparation of an injectable solution of the acid fumarate 14 grams of the acid fumarate and 6.75 grams N-methylglucamine were dissolved in enough water to make 2,000 milliliters. The solution has a pH of 5.4 to 5.5. Additional N-methylglucamine (5 to 10% excess) was then added to adjust the pH to a value between 6.0 and 6.5. Further processing was conventional.

(e) Hydrochloride of (1-phenyl-2-methyl)-1-butyl N-methylisonipecotate 6 grams of the ester base were dissolved in 70 ml. dry ethyl ether, and 4 ml. 5.8-normal hydrogen chloride in ether were added. A viscous precipitate formed. It crystallized upon stirring with a glass rod. The material was recrystallized from a mixture of ethyl acetate and petroleum ether, and had a melting point of 115° to 116° C. It readily dissolves in water and in lower alkanols, but is practically insoluble in petroleum ether.

EXAMPLE 2.—(1-PHENYL-2-METHYL)-1-BUTYL N-METHYL-ISONIPECOTATE

(a) N-methyl-isonipecotyl chloride hydrochloride 134 grams N-methyl-isonipecotic acid hydrochloride were added to about 550 ml. thionyl chloride, and the mixture was kept near its boiling point for about two hours. The excess thionyl chloride was then distilled off in a vacuum, and the solid residue was suspended in a small amount of chloroform free from alcohol. The solvent was evaporated, and the residue was dried in a vacuum at 50° to 70° C. The hydrochloride of N-methyl-isonipecotyl chloride was obtained in a 100% yield.

(b) (1-phenyl-2-methyl)-1-butyl N-methyl-isonipecotate (1-phenyl-2-methyl)-1-butanol was purified by conversion to the acetate and hydrolysis of the acetic acid ester. 50 grams of the purified alcohol were gradually added to a solution of 75 grams of the crude N-methyl-isonipecotyl chloride hydrochloride in about 600 ml. dry alcohol-free chloroform. The mixture was cooled with ice and agitated while 100 ml. pyridine were added drop by drop. The reaction mixture was heated on a water bath for one hour, and the solvent was removed by vacuum distillation.

The residue was added to a solution of 300 grams potassium carbonate in 600 ml. water containing 600 g. crushed ice and covered with diethyl ether in the manner described in Example 1, sub (b). The ester base was recovered from the ether layer by evaporation and purified by vacuum distillation. Its boiling point was 118° to 118.5° C. at 0.05 mm. Hg. The yield was 70%.

(c) Preparation of injectable solutions 1.0 gram of the ester base was dissolved in 6.92 ml. aqueous N/2 hydrogen chloride solution. The solution was diluted to 200 ml. with agitation, and its pH was adjusted to a value between 3.5 and 4.5 by dropwise addition of N/10 sodium hydroxide solution. The 0.5% solution of the hydrochloride was sterilized and distributed in ampules.

A 1% solution of the hydrochloride was prepared in an analogous manner by dissolving 1 g. of the ester base obtained in (b) above in 34.6 ml. aqueous N/10 hydrochloric acid. The solution was diluted with agitation to 100 ml., and the pH was adjusted to a value between 4 and 5 with N/10 sodium hydroxide solution.

Injectable solutions may also be prepared from the ester base and lactic acid and adjusted to the same pH range as the hydrochloride solutions.

EXAMPLE 3.—(1-PHENYL-2-METHYL)-1-BUTYL N-METHYL-ISONIPECOTATE METHOBROMIDE 5.8 grams (1-phenyl-2-methyl) - 1 - butyl N-methyl-isonipecotate were dissolved in ethyl acetate, and an excess of methyl bromide was added to the solution with intensive external cooling. The quaternary addition produce or methobromide was formed in an exothermic reaction, and crystallized promptly from the reaction mixture. It was recrystallized from a mixture of isopropanol and petroleum ether. It has a melting point of 168°–170° C. It is readily soluble in water.

EXAMPLE 4.—(1-PHENYL-2-METHYL)-1-BUTYL N-METHYL-ISONIPECOTATE METHOSULFATE 2.9 grams (1-phenyl-2-methyl)-1-butyl N-methyl-isonipecotate were dissolved in 5 ml. ethyl acetate, and 1.4 grams dimethyl sulfate were added to the mixture which was heated gently thereafter for 20 minutes. Diethyl ether was added to the clear solution until the quaternary addition compound (methosulfate) was precipitated in the form of small well-defined crystals. The yield of 3.5 grams was 87% of the theoretically expected amount. The melting point is 79° to 81° C.

The methosulfate dissolves readily in water, lower alkanols, chloroform, acetone, ethyl acetate, glacial acetic acid, and benzene. It is only sparingly soluble in ethers and petroleum hydrocarbons.

EXAMPLE 5.—(1-PHENYL-2-METHYL)-1-BUTYL N-METHYL-NIPECOTATE

(a) (1-phenyl-2-methyl)-1-butyl nicotinate

A suspension of 54 g. nicotinyl chloride hydrochloride in 300 ml. benzene was mixed with 49 g. 1-phenyl-2-methyl-1-butanol, and 71 g. pyridine were added drop by drop to the mixture. The reaction mixture was refluxed for several hours, and was then evaporated to dryness in a vacuum. The residue was taken up in benzene, and the insoluble pyridine hydrochloride was removed by suction filtration. The filtrate was concentrated by vacuum evaporation of the solvent, and the residue was distilled in a vacuum. B.P. 140° C. at 0.1 mm. Hg. Yield 80%.

(b) (1-phenyl-2-methyl)-1-butyl-N-methyl-nipecotate 16 grams of the nicotinic acid ester prepared as described sub (a) above were dissolved in 100 ml. glacial acetic acid and were hydrogenated at a pressure of approximately 3 atmospheres in the presence of 5 g. each of a 5% platinum/carbon catalyst and a 5% palladium/carbon catalyst. After the amount of hydrogen calculated for saturation of the pyridine nucleus had been absorbed, hydrogenation was interrupted, and 7 ml. of a 40% formaldehyde solution were added to the hydrogenation mixture. Hydrogenation then was continued to produce the N-methyl derivative of the hydrogenated ester.

The catalyst was removed from the hydrogenation mixture by filtration, the solvent was distilled off in a vacuum, and the residue was admixed to an ice cold potassium carbonate solution, as described in Example 1. The ether extract of the solution was evaporated, and the crude ester obtained was purified by vacuum distillation. At a pressure of about 0.1 mm. Hg, it had a boiling point of 135° to 137° C. The yield of the pure product was 11.5 grams (66%). It is readily soluble in dilute aqueous acids and in organic solvents.

EXAMPLE 6.—(1-PHENYL-2-METHYL)-1-BUTYL N-METHYL-NIPECOTATE METHOBROMIDE

A solution of 20 g. of the ester prepared according to Example 5 in 100 ml. ethyl acetate was cooled externally with a mixture of ice and common salt, and an excess of methyl bromide was added. The quaternary piperidinium salt formed in the cold mixture and crystallized. Its melting point is 205° to 207° C. It is readily soluble in water and lower alkanols, but only sparingly soluble in ethyl acetate, ether, and liquid petroleum hydrocarbons. The aqueous solution is practically neutral.

EXAMPLE 7.—1-PHENYL-1-n-HEPTYL NIPECOTATE

(a) 1-phenyl-1-heptyl nicotinate

A solution of 146.3 g. (0.75 mole) nicotinyl chloride hydrochloride (90%) in 300 ml. benzene was mixed with 144 grams (0.75 mole) 1-phenyl-1-n-heptanol, and 179 g. pyridine were added drop by drop with stirring. The mixture was refluxed for about 1–2 hours. It was then cooled to ambient temperature, and a precipitate of pyridine chloride was filtered off with suction. The filtrate was evaporated in a vacuum to remove excess pyridine and the solvent, and the residue was taken up in much petroleum ether. The mixture was permitted to stand overnight, and residual undissolved material was removed by filtration. The solvent was distilled from the filtrate. The residue was purified by vacuum distillation. The 1-phenyl-1-n-heptyl nicotinate has a boiling point of 135° C. at 0.1 mm. Hg. The yield was 75%.

(b) 1-phenyl-1-n-heptyl nipecotate 46.4 grams 1-phenyl-1-n-heptyl nicotinate dissolved in 150 ml. glacial acetic acid were hydrogenated at 2 to 3 atmospheres pressure in the presence of 6 grams each of 5% Pt/C and Pd/C catalysts. The hydrogenation was interrupted when the amount of hydrogen calculated for saturation of the pyridine rings present had been absorbed. The catalyst was removed from the hydrogenation mixture by filtration, and the filtrate was evaporated in a vacuum.

The residue was taken up in ethyl acetate. About 3 g. nipecotic acid formed by hydrolysis precipitated, and were filtered off. The filtrate was evaporated, and the residue was frationated in a vacuum. The 1-phenyl-1-heptyl nipecotate was recovered as a fraction boiling at about 140° C. at 0.1 mm. Hg. Phenylheptane was obtained as a lower boiling fraction.

The ester is only sparingly soluble in water, but readily dissolves in all commonly employed organic solvents. It is not very soluble in dilute aqueous hydrochloric acid. Aqueous solutions of the acid salts may be prepared from the lactate of the ester base.

EXAMPLE 8.—1-PHENYL-1-n-HEPTYL N-METHYL-NIPECOTATE 45 grams N-methyl-nipecotyl chloride hydrochloride prepared by the method of the Von Werder Patent No. 2,428,253 were suspended in 250 ml. benzene. Approximately 31 grams 1-phenyl-1-n-heptanol and 40 ml. pyridine were admixed in this order, and the resulting mixture was heated to a boil for 1 to 2 hours. The ester formed was isolated by the procedure described in Example 1(b).

1-phenyl-1-n-heptyl N-methyl-nipecotate boils at 135° C. at 0.1 mm. Hg. It is insoluble in water, but miscible with the usual organic solvents and readily soluble in dilute hydrochloric acid.

EXAMPLE 9.—1-PHENYL-1-n-HEPTYL ISONIPECOTATE 22 grams 1-phenyl-1-n-heptyl isonicotinate having a boiling point of 150° C. at 0.1 mm. Hg were prepared from 21 g. isonicotinyl chloride hydrochloride and 22.8 grams 1-phenyl-1-heptanol in a procedure analogous to those described in Example 1(a) and in Example 7(a).

The 1-phenyl-1-heptyl isonicotinate was carefully hydrogenated at room temperature in glacial acetic acid solution (100 ml.) in the presence of 5 g. of a 5% platinum/carbon catalyst at a hydrogen pressure of approximately two atmospheres. The filtrate obtained after removal of the catalyst from the hydrogenation mixture was evaporated, and the residue was repeatedly distilled in a vacuum.

The 1-phenyl-1-n-heptyl isonipecotate obtained boils at 160° C. at 0.1 mm.

The acid fumarate of this ester was obtained by mixing a solution of 5.1 g. of the ester base in 10 ml. methanol with 1.95 g. fumaric acid, diluting the mixture with about 85 ml. diethyl ether, and rubbing the precipitate formed with a glass rod to induce crystallization. The fumarate was recrystallized from acetone. It has a melting point of 100° to 102° C. and is soluble in water, methanol, acetone, and chloroform, but only sparingly soluble in most other commonly employed organic solvents.

EXAMPLE 10.—1-p-CHLOROPHENYL-1-n-HEPTYL N-METHYL-ISONIPECOTATE

(a) 1-(4'-chlorophenyl)-1-heptanol

A solution of hexyl magnesium bromide was prepared from 18 g. magnesium, 120 g. 1-n-hexyl bromide, and 175 ml. diethyl ether in a conventional manner. A solution of 84.4 g. p-chlorobenzaldehyde in 70 ml. ether was added drop by drop with stirring. The reaction mixture was stirred into crushed ice. The aqueous phase obtained was neutralized with hydrochloric acid, and the alcohol formed was extracted with diethyl ether. The extract was dried, the solvent was evaporated, and the residue was distilled in a vacuum. The 1-p-chlorophenyl-1-n-heptanol weighed 90 g. and boiled at 147–150° C. at 3 mm. Hg.

(b) *1-p-chlorophenyl-1-n-heptyl N-methyl-isonipecotate*

About 30 g. N-methyl-isonipecotyl chloride hydrochloride were prepared by the method described in Example 2, and were suspended in 300 ml. benzene. 31.7 grams 1-p-chlorophenyl-1-heptanol were admixed, and 50 ml. anhydrous pyridine were added thereafter drop by drop while the temperature was held between 10° and 20° C. by external cooling. The reaction mixture was kept at elevated temperature for about three hours on a water bath, and the liquid portion thereof was separated from the solids by filtration with suction.

The filtrate was evaporated to remove solvents, and the residue was added with stirring to a solution of 100 grams potassium carbonate in 200 ml. water containing 300 grams ice and covered by a layer of diethyl ether. The ester base formed was dissolved in the ether layer, and was recovered therefrom by evaporation of the ether after drying in an amount of 46.1 g. (92%). The boiling point of the product was about 157° C. at a pressure between 0.1 and 0.2 mm. Hg. The purified distilled product weighed 40.5 g. (82% yield).

The ester base is a slightly viscous oil which is readily soluble in the common organic solvents, but is insoluble in water. It forms water soluble acid addition salts with mineral acids and with fairly strong organic acids.

(c) *Acid fumarate of 1-p-chlorophenyl-1-n-heptyl N-methyl-isonipecotate*

20.8 grams of the ester base were dissolved in 30 ml. methanol, and 6.86 g. fumaric acid were admixed with stirring until the acid completely dissolved. Upon addition of 300 ml. diethyl ether to the solution, the acid fumarate of the ester base was precipitated. It has a melting point of 125° to 126° C., and is fairly soluble in water, readily soluble in lower alkanols and chloroform. It can be recrystallized from ethyl acetate.

(d) *1-p-chlorophenyl-1-n-heptyl N-methyl-isonicotate hydrochloride*

A solution of 10.5 g. of the ester base prepared according to the procedure described sub (b) above in 100 ml. diethyl ether was mixed with a 6-normal solution of hydrogen chloride in ether whereupon the hydrochloride of the ester base was precipitated as a viscous mass. It crystallized rapidly upon seeding. 10.8 grams of the hydrochloride were obtained (yield 93%). Its melting point is 141° to 143° C. The hydrochloride may be recrystallized from a small amount of ethyl acetate or methyl acetate. It is very soluble in water, lower alkanols, and chloroform, but only sparingly soluble in liquid petroleum hydrocarbons.

EXAMPLE 11.—1-p-TOLYL-1-n-HEPTYL N-METHYL-ISONIPECOTATE (a) *Free ester base*

30 grams N-methyl-isonipecotyl chloride hydrochloride and 28.9 g. 1-p-tolyl-1-n-heptanol were reacted as described in Example 10(b). When the reaction mixture was worked up in the manner of Example 10, the 1-p-tolyl-1-heptyl N-methyl-isonipecotate was recovered in a yield of less than 20%. The solid portion of the esterification mixture was therefore also treated with ice cold potassium carbonate solution, and the aqueous mixture was quickly extracted with diethyl ether. The ether was evaporated, and the residue was distilled in a vacuum. 28.4 grams 1-p-tolyl-1-heptyl N-methyl-isonipecotate distilled at 144° C. at 0.1 to 0.2 mm. Hg, making the total yield 80%.

(b) *Acid fumarate*

5.22 grams fumaric acid were admixed to a solution of 14.9 grams of the above ester base in 20 ml. methanol. Upon dissolution of the acid, 200 ml. diethyl ether were added to precipitate the acid fumarate. It melts at 125°–126° C., is only slightly soluble in water, but soluble in lower alkanols and chloroform, sparingly soluble in ethers and liquid petroleum hydrocarbons. It can be recrystallized from ethyl acetate.

(c) *Hydrochloride*

8.37 grams of the ester base were dissolved in 50 ml. diethyl ether, and 50 ml. of a 0.6-normal solution of HCl in ether were added, whereupon the hydrochloride was precipitated in crystalline form. It can be recrystallized from a small amount of methyl acetate, or from a mixture of ethyl acetate and petroleum ether (B.P. 40–60° C.). The yield was 8 g. (86%). The hydrochloride melts at 134° to 135° C. It is readily soluble in water, lower alkanols, chloroform, and glacial acetic acid, but only sparingly soluble in liquid petroleum hydrocarbons.

EXAMPLE 12.—1-PHENYL-1-n-HEPTYL N-METHYL-ISONIPECOTATE 26.2 grams N-methyl-isonipecotyl chloride hydrochloride and 23 g. 1-phenyl-1-heptanol were esterified as described in Example 10(b). 32 grams of the ester (85%) were obtained. The ester has a boiling temperature of 150° to 158° C. at 0.1 to 0.2 mm. Hg. The 1-phenyl-1-heptyl N-methyl-isonipecotate is insoluble in water, but readily soluble in aqueous solutions of mineral acids and in organic solvents.

The hydrochloride of the ester base precipitated as an oily liquid when a solution of 10 grams of the ester base in 50 ml. diethyl ether was mixed with 7 ml. of a 5-normal solution of HCl in ether. The oily precipitate crystallized upon rubbing with a glass rod. It was dissolved in hot ethyl acetate. Petroleum ether was added to the solution. When the wall of the glass container holding the solution was rubbed with a glass rod below the liquid level, the purified product quickly precipitated in crystalline form. Melting point 128° to 130° C.

The hydrochloride is readily soluble in water, lower alcohols, acetone, and chloroform, but only slightly soluble in ethers and in liquid petroleum hydrocarbons.

EXAMPLE 13.—1,2-DIPHENYL-ETHYL N-METHYL-NIPECOTATE 8.4 grams sodium monoxide (0.135 mole) were admixed to a solution of 26.4 g. 1,2-diphenylethanol (0.133 mole) in 65 ml. xylene. Stirring at room temperature was continued for 24 hours. The temperature was raised to 60°–70° C., and 26.4 g. (0.133 mole) N-methyl-nipecotyl chloride hydrochloride were admixed in small batches over a period of about three hours. The mixture was refluxed and agitated for several additional hours.

The reaction mixture then was cooled to room temperature, and 100 ml. 2 N hydrochloric acid were added. The xylene phase was removed, and the aqueous phase was made barely alkaline with sodium hydroxide, an excess of alkali being carefully avoided. The free ester base was extracted from the aqueous solution with ether. The extract was dried, and the ether was evaporated. The residue was distilled in a vacuum. The 1,2-diphenyl-ethyl N-methyl-nipecotate boiled at 160° to 165° at 0.01 mm. Hg.

EXAMPLE 14.—1,2-DIPHENYL-ETHYL N-METHYL-NIPECOTATE METHOBROMIDE

A solution of 3.2 g. of the ester base obtained according to Example 13 in 10 ml. ethyl acetate was mixed with 10 ml. of a 20% solution of methyl bromide in ethyl acetate, and the mixture was left to stand at room temperature over night. The precipitate was filtered off with suction, and was recrystallized from acetonitrile. The methobromide obtained melts at 202° to 203° C. It is very soluble in water.

Other compounds of the invention which may be prepared by methods analogous to those described in Examples 1 to 14 include the following:

(1-phenyl-3-m-ethylphenyl)-1-propyl nipecotate
1-phenyl-1-ethyl N-ethyl-isonipecotate ethobromide
(1-phenyl-3-ethyl)-1-n-heptyl isonipecotate

EXAMPLE 15

(a) *Injectable solutions*

Injectable aqueous solutions of the compounds prepared in the preceding examples were prepared in the manner described in Examples 1(d) and 2(c) with concentrations of 0.1 to 5 percent of the active ester.

(b) *Capsules, tablets, and coated pills*

The acid fumarate of (1-phenyl-2-methyl)-1-butyl N-methyl-isonipecotate prepared as described in Example 1(c) was finely powdered, and 40 milligram batches of the powder were charged into gelatin capsules on conventional equipment.

An inert powdered excipient was prepared from 99.5 parts (by weight) corn starch and 0.5 part magnesium stearate, U.S.P. XVI. Tablets containing 20 mg. of the acid fumarate prepared according to Example 1(c) uniformly dispersed in the excipient were prepared on a conventional tableting machine.

Another excipient was prepared from 21 parts sucrose, 21 parts lactose, 57 parts corn starch, and 1 part magnesium stearate, U.S.P. XVI. Tablets containing 25 mg. of the aforementioned acid fumarate, and otherwise consisting of the excipient were made in the conventional manner.

A further batch of tablets was prepared from 40 mg. of the fumarate per tablet and from an excipient consisting of 5 parts sucrose, 2.5 parts gelatin, 82.5 parts corn startch, 5 parts stearic acid, and 5 parts magnesium stearate.

The tablets respectively containing 20, 25, and 40 mg. of the acid fumarate may be coated with sugar in a conventional manner to produce coated pills.

While the invention has been described with particular reference to specific embodiments, it is to be understood that it is not limited thereto, but is to be construed broadly and restricted solely by the scope of the appended claims.

What we claim is:

1. A spasmolytic compound selected from the group consisting of substituted benzyl esters of nipecotic acid and isonipecotic acid having the formula

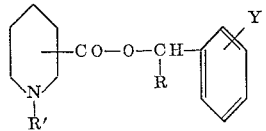

wherein R is a member of the group consisting of alkyl radicals having 2 to 8 carbon atoms and aralkyl radicals having 7 to 10 carbon atoms; R' is a member of the group consisting of hydrogen and lower alkyl; and Y is a member of the group consisting of hydrogen, halogen, and lower alkyl; acid addition salts of said esters with physiologically tolerated acids; and therapeutically useful lower alkyl quaternary ammonium salts of said esters.

2. A compound as set forth in claim 1, which is an ester of nipecotic acid.

3. A compound as set forth in claim 1, which is an ester of isonipecotic acid.

4. Quaternary piperidinium salts of substituted benzyl esters of nipecotic acid and isonipecotic acid having the formula

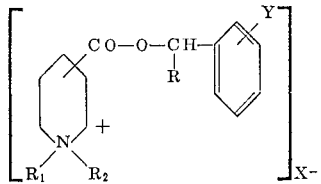

wherein R is a member of the group consisting of alkyl radicals having 2 to 8 carbon atoms and aralkyl radicals having 7 to 10 carbon atoms; $R_1$ and $R_2$ are lower alkyl; Y is a member of the group consisting of hydrogen, halogen, and lower alkyl; and X is the anion of a strong, physiologically tolerated acid.

5. 1-p-chlorophenyl-1-n-heptyl N-methyl-isonipecotate.
6. 1-p-tolyl-1-n-heptyl N-methyl-isonipecotate.
7. (1-phenyl-2-methyl)-1-butyl N-methyl-isonipecotate.
8. An acid addition salt of (1-phenyl-2-methyl)-1-butyl N-methyl-isonipecotate with a physiologically tolerated acid.
9. An acid addition salt as set forth in claim 8, wherein said acid is fumaric acid.
10. (1-phenyl-2-methyl)-1-butyl N-methyl-nipecotate.
11. 1-phenyl-1-n-heptyl nipecotate.
12. 1-phenyl-1-n-heptyl isonipecotate.
13. 1,2-diphenylethyl N-methyl-nipecotate.
14. 1-phenyl-1-n-heptyl N-methyl-nipecotate.
15. 1-phenyl-1-n-heptyl N-methyl-isonipecotate.
16. (1-phenyl-2-methyl)-1-butyl N - methyl - isonipecotate N-methobromide.
17. (1-phenyl-2-methyl)-1-butyl N - methyl - isonipecotate N-methosulfate.
18. (1-phenyl-2-methyl)-1-butyl N-methyl-nipecotate N-methobromide.
19. 1,2-diphenylethyl N-methyl-nipecotate methobromide.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,182,791 | 12/1939 | Dalmer et al. | 260—294 X |
| 2,615,024 | 10/1952 | Clinton et al. | 260—294.3 |
| 2,738,351 | 3/1956 | Dickison et al. | 260—233.4 |
| 2,759,942 | 8/1956 | Krapcho | 260—294.3 X |
| 3,056,726 | 10/1962 | Marsh | 167—65 |
| 3,066,074 | 11/1962 | Hartgerink | 167—65 |

FOREIGN PATENTS 336,414   5/1921   Germany.

OTHER REFERENCES

Sperber et al., J. Am. Chem. Soc., vol. 81, pp. 704–709 (1959).

WALTER A. MODANCE, *Primary Examiner.*

JOHN D. RANDOLPH, *Examiner.*

JOSE TOVAR, AVROM D. SPEVACK,
*Assistant Examiners.*